US007938748B2

(12) United States Patent
Minegishi et al.

(10) Patent No.: US 7,938,748 B2
(45) Date of Patent: May 10, 2011

(54) POWER TRANSMISSION DEVICE AND METHOD OF PRODUCING THE SAME

(75) Inventors: Kiyoji Minegishi, Obu (JP); Yuji Yano, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 27 days.

(21) Appl. No.: 12/509,588

(22) Filed: Jul. 27, 2009

(65) Prior Publication Data

US 2010/0004087 A1     Jan. 7, 2010

Related U.S. Application Data

(63) Continuation of application No. PCT/JP2008/051851, filed on Feb. 5, 2008.

(30) Foreign Application Priority Data

Feb. 5, 2007   (JP) .................................. 2007-025198

(51) Int. Cl.
    *F16H 23/00*     (2006.01)
(52) U.S. Cl. ........................................ 475/163; 475/168
(58) Field of Classification Search .................. 475/163, 475/168, 180
    See application file for complete search history.

(56) References Cited

U.S. PATENT DOCUMENTS

| | | | | |
|---|---|---|---|---|
| 3,240,158 A | * | 3/1966 | Brundage | ...................... 418/133 |
| 4,090,822 A | * | 5/1978 | Mount et al. | ..................... 418/60 |
| 4,896,567 A | * | 1/1990 | Zhou | .............................. 475/170 |
| 6,231,469 B1 | | 5/2001 | Wang et al. | |
| 2009/0199797 A1 | * | 8/2009 | Schafer et al. | ............. 123/90.17 |

FOREIGN PATENT DOCUMENTS

| | | |
|---|---|---|
| DE | 19600191 | 7/1996 |
| DE | 19857031 | 6/1999 |
| EP | 0347738 | 12/1989 |
| EP | 1559610 | 8/2005 |
| JP | 02-038732 | 2/1990 |
| JP | 07-279601 | 10/1995 |
| JP | 2005-211142 | 8/2005 |

* cited by examiner

*Primary Examiner* — Ha D. Ho
(74) *Attorney, Agent, or Firm* — Squire, Sanders & Dempsey (US) LLP

(57) ABSTRACT

The power transmission device has an internally meshing planetary gear mechanism that has an input shaft, an eccentric body provided on the input shaft, an externally toothed gear eccentrically oscillating via the eccentric body, and an internally toothed gear with which the externally toothed gear internally meshes. The externally toothed gear is assembled to the internally toothed gear in an interference fit.

3 Claims, 16 Drawing Sheets

POWER TRANSMISSION DEVICE AND METHOD OF PRODUCING THE SAME

CROSS-REFERENCE RELATED APPLICATION

This is a continuation application under 35 USC §120 of PCT International Patent Application No. PCT/JP2008/051851, which was filed on Feb. 5, 2008. The disclosure of the prior application is hereby incorporated by reference herein in it's entirety. The parent application claims priority of Japanese patent application 2007-025198, filed on Feb. 5, 2007.

TECHNICAL FIELD

The present invention relates to a power transmission device, and particularly, to a power transmission device provided with a reverse driving preventing function, and a method of producing the same.

BACKGROUND ART

Depending on its application, a power transmission device may require a reverse driving preventing function. In Patent Document 1, a configuration in which a speed reduction mechanism with a starting efficiency of 40% or more is adopted as a speed reduction mechanism of a drive system, and a frictional force imparting means that will always provide resistance during operation due to friction occurring between any rotational member on the power transmission path of the speed reduction mechanism, is arranged at any position on the power transmission path, is disclosed.

This invention utilizes the difference between static friction and dynamical friction or the difference between starting efficiency and operating efficiency for realization of "reverse rotation prevention", and has features such that the operating efficiency itself of the speed reduction mechanism of the power transmission device is high, and the starting efficiency is made low by the friction imparting means. Since the frictional force given by the friction imparting means decreases when the speed reduction mechanism starts its rotation, the power transmission device is allowed to perform the operation of enhancing its inherent efficiency once starting.

In addition, in this Japanese Unexamined Patent Application Publication No. 2004-301278, an internally meshing planetary gear mechanism having an input shaft, an eccentric body provided on the input shaft, an externally toothed gear eccentrically oscillating via the eccentric body, and an internally toothed gear with which the externally toothed gear internally meshes is taken as an example of the speed reduction mechanism with high starting efficiency.

However, since the technique disclosed in this Patent Document 1 provides "resistance caused by friction" onto the power transmission path, the degradation of efficiency (although the coefficient of dynamic friction is small) inevitably occurs accordingly. Therefore, in a device to be used while constantly moving (without repetitive starting and stopping) like, for example, a panel for solar photovoltaic power generation or a driving unit of a wind power generation system, it is considered problematic that this effect may not always be exhibited.

The enhancement of transmission efficiency of a simple drive system that makes the above "friction resistance to be given" smaller is directly connected with deterioration in a reverse driving preventing function. Recently, in a solar power generation device, the technique of irradiating a transducer with light condensed by use of a lens is also suggested in order to enhance power generation efficiency. In this device, extremely accurate positioning (tailing) of the sun is necessary. That is, a powerful reverse driving preventing function is required since neither deceleration nor acceleration is allowed in addition to reverse rotation with respect to normal driving (tailing) of the power generation panel. Additionally, even in wind power generation, it is necessary to align the direction of a nose cone of a windmill blade with the direction in which the wind blows, and to maintain the pitch of the windmill blade to a state where there is a little wind resistance in order to protect the system, for example, at the time of a typhoon. That is, the powerful reverse rotation preventing function is required even here.

Moreover, in the device according to Patent Document 1, a gear mechanism is adopted for power transmission. Therefore, since the backlash by meshing unavoidably occurs, the device is regarded as problematic, particularly in an application that requires advanced positioning accuracy. Since the backlash appears as vibration of the windmill blade, for example in the case of the wind power generation system, it is likewise but not preferable that the backlash exists.

DISCLOSURE OF THE INVENTION

The invention was devised in order to solve such problems, and the object thereof is to provide a power transmission device having high inherent driving efficiency and a strong reverse driving preventing function, and capable of minimizing backlash, in an application that is always continuously driven, for example, in an application such as solar power generation or wind power generation.

The invention includes an internally meshing planetary gear mechanism having an input shaft, an eccentric body provided on the input shaft, an externally toothed gear eccentrically oscillating via the eccentric body, and an internally toothed gear with which the externally toothed gear internally meshes, and taking out the relative rotation between the externally toothed gear and the internally toothed gear as output while absorbing a oscillating component of the externally toothed gear, and the externally toothed gear is assembled to the internally toothed gear in an interference fit, whereby the above problems are solved.

In the invention, the internally meshing planetary gear mechanism is provided as the basic configuration of the speed reduction mechanism, and not "friction resistance" but "fit resistance" by interference fit is given to the driving system as a configuration that reliably guarantees a reverse rotation preventing function.

The invention can be said to skillfully utilize the characteristics of the power transmission operation of the internally meshing planetary gear mechanism. The term "internally meshing planetary gear mechanism" includes a structure in which a planetary gear mechanism that internally touches the internally toothed gear while the externally toothed gear oscillates, and a uniform velocity internally toothed mechanism that takes out only the relative rotation of the externally toothed gear and the internally toothed gear as output while absorbing the oscillating component of the oscillating motion of the externally toothed gear.

As described below in detail, in this structure, when the externally toothed gear "is oscillated" by the torque input from the input shaft, a clearance is formed ahead in the direction of the axial rotation of the externally toothed gear (the internally toothed gear when the axial rotation of the externally toothed gear is restrained and when the output from the internally toothed gear is made) due to elastic deformation by a driving force, the oscillating is hardly hindered irrespective of whether the fit resistance is present, and thus the externally toothed gear can be smoothly rotated. Meanwhile, when the torque to directly "rotate" the externally toothed gear (the internally toothed gear at the time of output from the internally toothed gear) (in the circumferential direction) is applied by the torque input from the output shaft, this "rotation torque" is barely converted into the "oscillating" of the externally toothed gear, and acts as strong resistance in cooperation with the presence of fit resistance.

Since the characteristics that the operating efficiency is high and reverse driving is hard are indifferent to the time of operation or to the time of stop, and excellent operation is obtained even in an application in which operation is continuous and even in applications in which starting/stopping or acceleration/deceleration is repeated.

Additionally, since the externally toothed gear and the internally toothed gear mesh with each other by interference fit, backlash is not generated basically (or the backlash is the smallest even if it exists in terms of the relationship of accuracy or the like). Accordingly, (for example, even if the invention is applied to applications in which starting/stopping or acceleration/deceleration is repeated), clattering is small, operation is smooth, and the accuracy of positioning is high.

According to the invention, although inherent operating efficiency is high, it is possible to obtain a power transmission device having a powerful reverse driving preventing function, capable of minimizing backlash, and having smooth rotation and high positioning accuracy.

PREFERRED EMBODIMENTS FOR CARRYING OUT THE INVENTION

Figure 1:
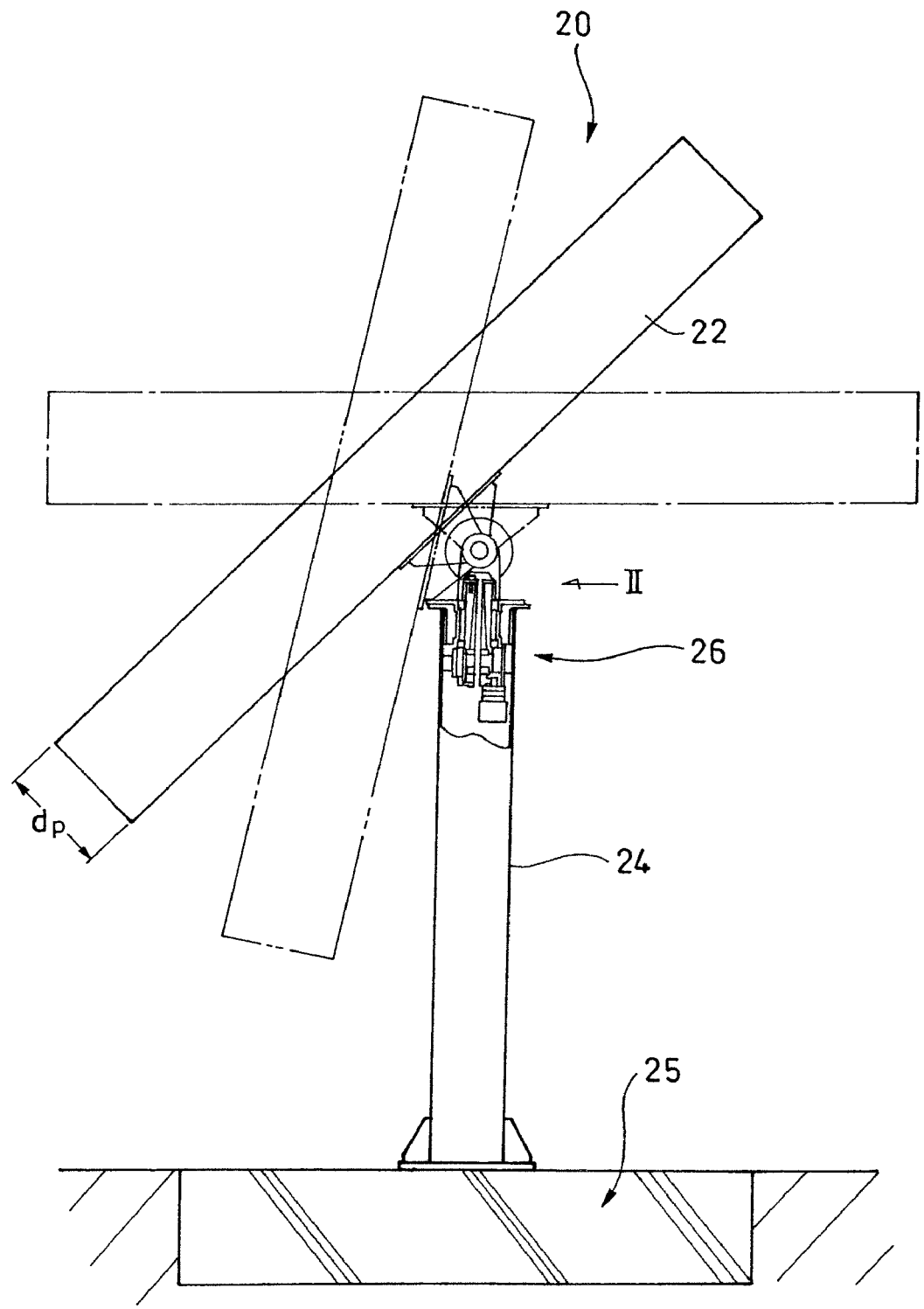
FIG. 1 is a schematic configuration view of a whole solar power generation system where an example of a driving unit according to the invention is applied.

An example of a driving unit of a solar power generation system into which a reduction gear, related to an example of a power transmission device according to the invention, is assembled will be described below in detail. FIG. 1 shows the outline of the whole solar power generation system 20.

The solar power generation system 20 is provided with a power generation panel 22, and a cylindrical strut (support) 24 that supports the power generation panel 22 for drawing electric power from sunlight. The cylindrical strut 24 is erected on a foundation (base) 25 that is buried in the earth. A driving unit 26 for driving the power generation panel 22 is arranged and housed at an uppermost portion of the cylindrical strut 24.

In this embodiment, in order to enhance the efficiency of power generation to its highest level, a configuration in which sunlight is focused using a lens, not shown, while constantly tracking the sun's position, is increased to several hundreds times intensity, and is then applied to a transducer is adopted. For this reason, the dimension dp of the power generation panel 22 in its thickness direction is significantly large compared with the conventional power generation panel (2). It is necessary that the power generation panel 22 follows the sun with great accuracy. Therefore, the panel is provided with the driving unit 26 as shown in detail below in FIG. 2.

Figure 2:
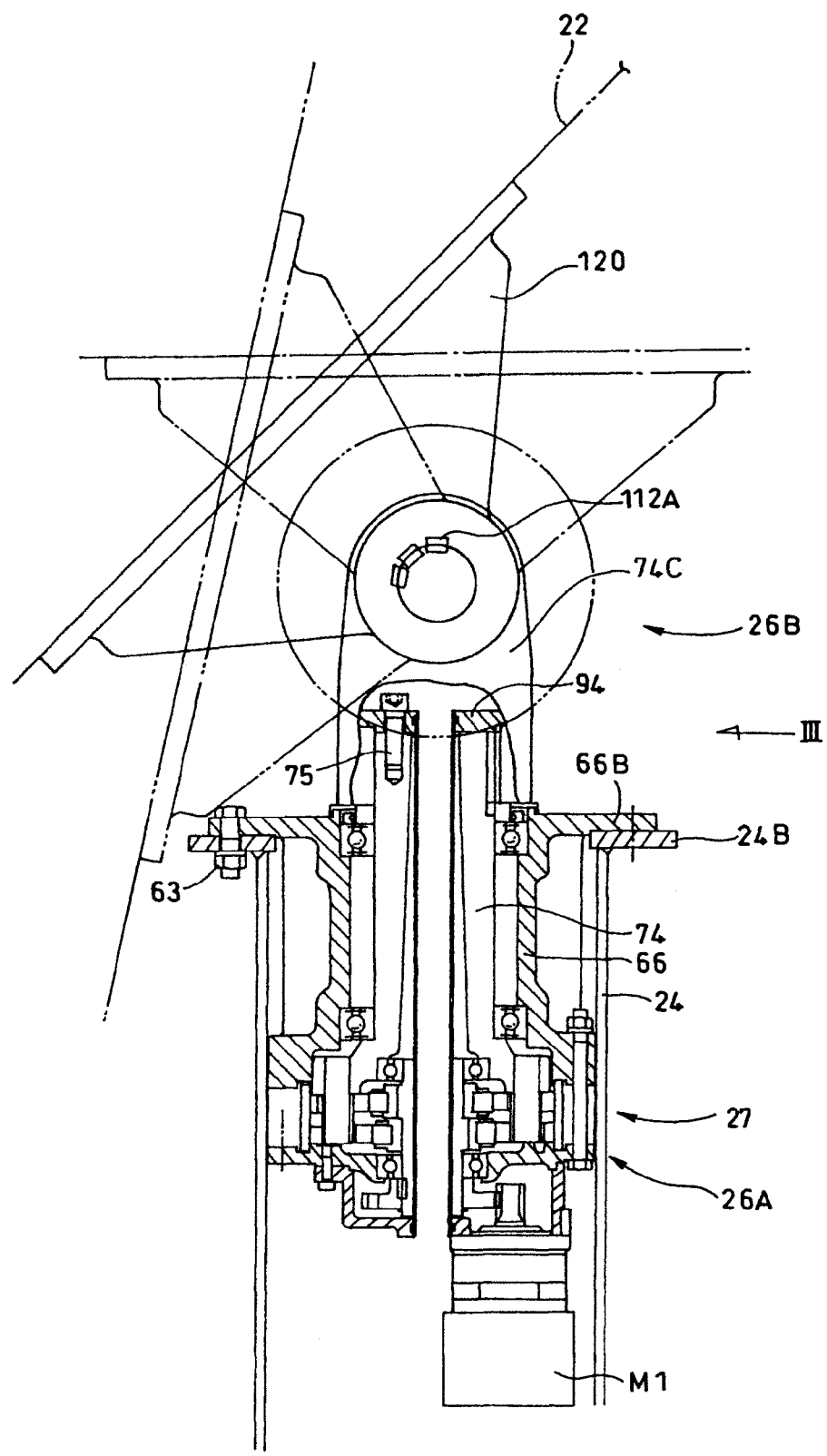
FIG. 2 is an enlarged sectional side view when the vicinity of the driving unit 26 of FIG. 1 is seen from the direction of an arrow II.
Figure 3:
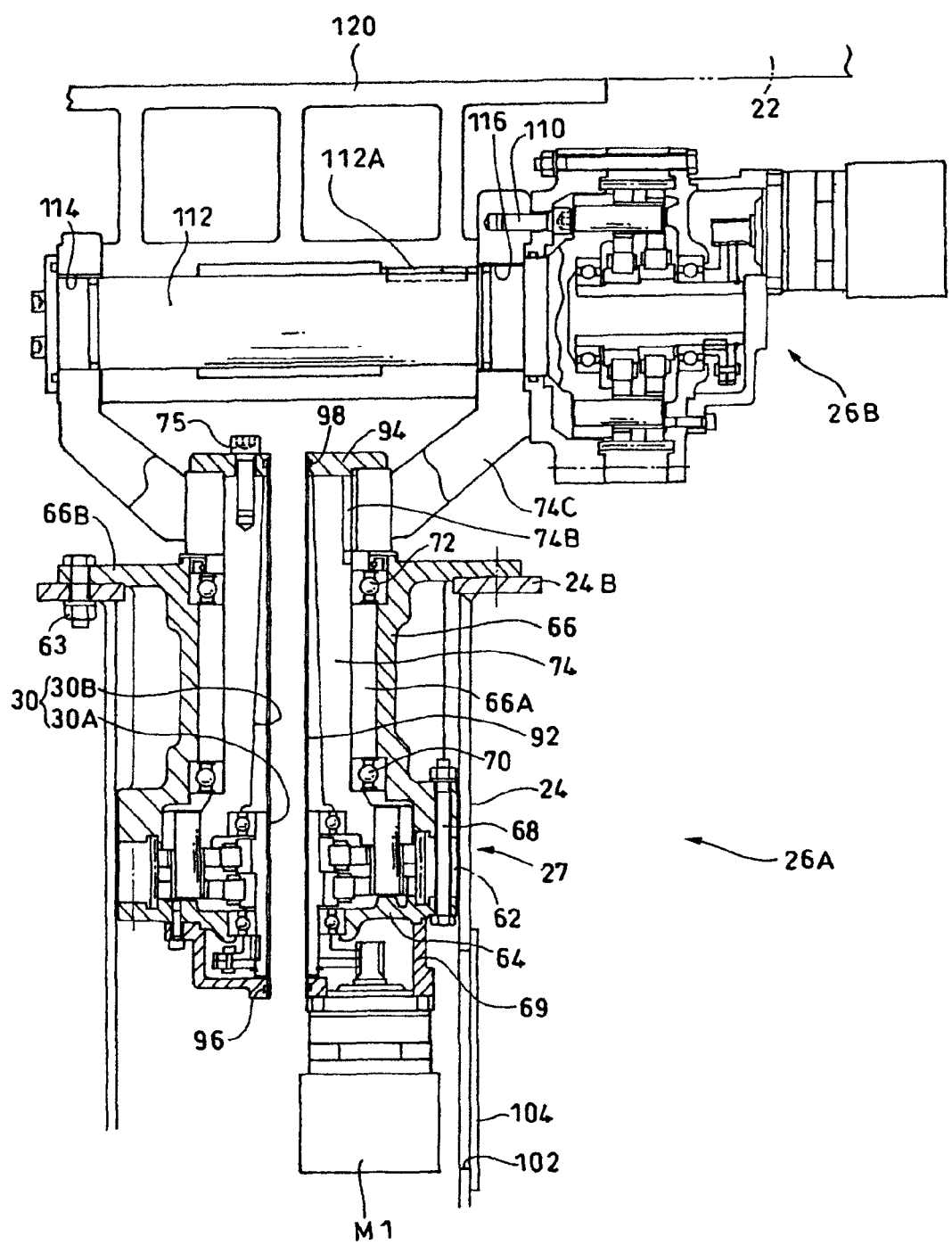
FIG. 3 is a front sectional view as seen from the direction of an arrow III of FIG. 2.
Figure 4:
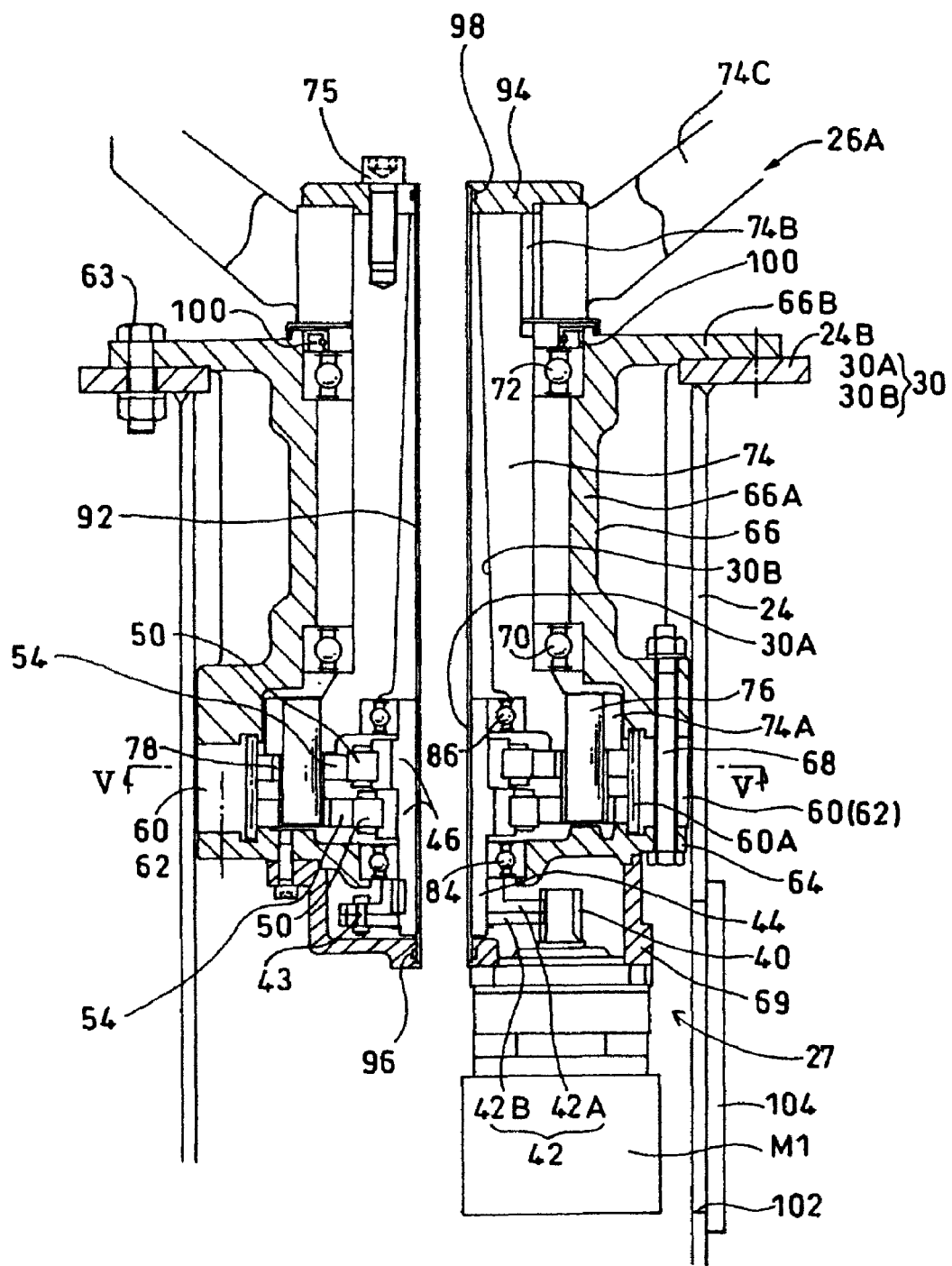
FIG. 4 is an enlarged sectional view of essential parts of FIG. 3.
Figure 5:
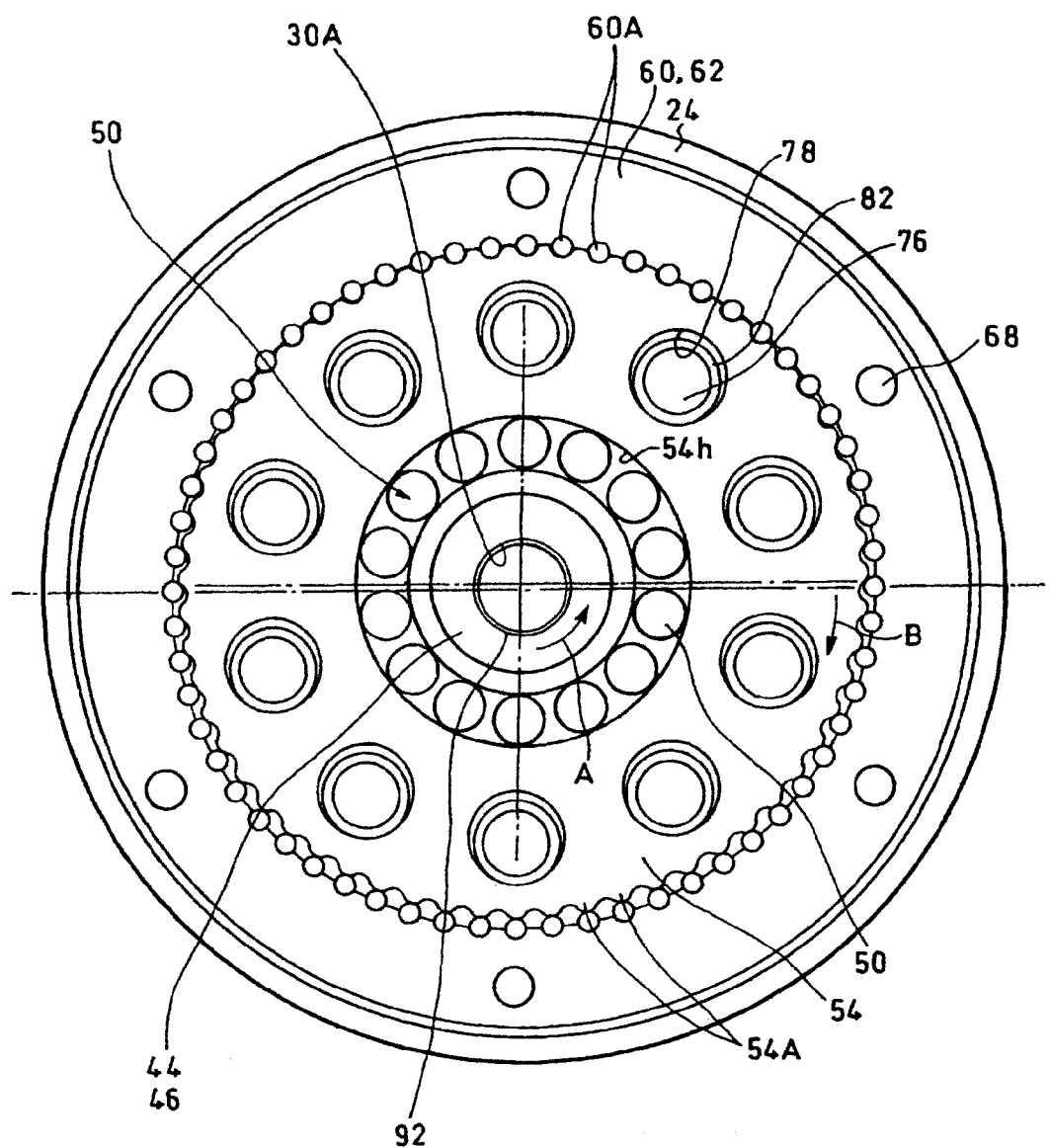
FIG. 5 is a sectional view taken along a line V-V in the arrow direction of FIG. 4.

FIG. 2 is an enlarged sectional view as the vicinity of the driving unit 26 of FIG. 1 is seen, FIG. 3 is a front sectional view as seen from the direction of an arrow III of FIG. 2, FIG. 4 is an enlarged sectional view of essential parts of FIG. 3, and FIG. 5 is a sectional view taken along a line V-V of FIG. 4.

Referring to FIGS. 2 to 4, the driving unit 26 is provided with a reduction gear 26A (power transmission device) for turning (for horizontal driving) that reduces the rotational speed of a motor M1. The reduction gear 26A adopts an internally meshing planetary gear mechanism, and has a through hole 30 for allowing a power cable, or the like, to be inserted therethrough, therein, and most importantly thereof is housed and arranged inside the uppermost portion of the cylindrical strut 24. In addition to this, the driving unit 26 is also provided with a reduction gear 26B (power transmission device) for tilting (for vertical driving) that is installed at an output shaft 74 of the reduction gear 26A for turning. The reduction gear 26A for turning and the reduction gear 26B for tilting are basically the same reduction gear except for the output shaft, and an attachment case. Therefore for convenience, the reduction gear 26A for turning will be described herein in detail.

Referring to FIGS. 3 to 5, the reduction gear 26A for turning is provided with an input shaft 44 that receives the rotation of a pinion 40 of the motor M1 via a gear 42. In the gear 42, gear bodies 42A and 42B are connected together by a bolt 43, so as to be in a so-called scissors state, and backlash is made almost completely zero. The input shaft 44 has an eccentric body 46 at a portion of the outer periphery thereof. An externally toothed gear 54 is eccentrically, oscillatably, and rotatably mounted on an outer periphery of the eccentric body 46 via a roller bearing 50. The externally toothed gear 54 internally meshes with an internally toothed gear 60. In addition, in this embodiment, although two externally toothed gears 54 are provided in parallel with an eccentric phase difference of 180 degrees to increase their capacity, their basic structure is also the same as that of each externally toothed gear 54.

The internally toothed gear 60 is provided with roller-like outer pins 60A as internal teeth. The outer pins (internal teeth) 60A of the internally toothed gear 60 are one more in number than the number of external teeth 54A of the externally toothed gear 54. The internally toothed gear 60 is integrated with a first casing (main casing) 62 of the reduction gear 26A.

A second casing 64 and a third casing 66, which function as a reduction gear cover, are connected with both axial (vertical) side portions of the first casing 62 via bolts 68, respectively. The third casing 66 is provided with a cylindrical portion 66A and a flange 66B, and the reduction gear 26A is fixed to the cylindrical strut 24 by fixing the flange 66B to a top flange 24B integrally formed in the cylindrical strut 24 with a bolt 63. Additionally, the output shaft 74 is supported by a pair of bearings 70 and 72 arranged at the ends of the cylindrical portion 66A.

An inner pin 76 is press-fitted into a flange portion 74A of the output shaft 74, and the inner pin 76 is loosely fitted into an inner pin hole 78 of the externally toothed gear 54. An internal roller 82 is rotatably put on the inner pin 76, and thus, friction with the inner pin hole 78 is reduced.

The aforementioned input shaft 44 is supported at both ends via one pair of bearings 84 and 86 by the output shaft 74 and the second casing 64. The input shaft 44 and the output shaft 74 have through holes 30 (an input shaft through hole 30A and an output shaft through hole 30B) axially formed at radial central portions thereof.

A pipe 92 is arranged within the through hole 30 so as to pass therethrough. The pipe 92 has one end supported by a fourth casing 69 of the reduction gear 26A and has the other end supported by a lid (member) 94 integrated with the output shaft 74 via a bolt 75. O rings (sealing machine style) 96 and 98 are respectively provided between the respective supporting portions, i.e., the outer periphery of the pipe 92, and the fourth casing 69 and the lid 94 (integrated with the output shaft 74), thereby isolating the inside of the reduction gear 26A from the external world. In other words, the pipe 92 also serves as a casing on the inner peripheral side of the reduction gear 26A, and forms a space that houses lubricant.

In addition, reference numeral 100 represents a seal ring, reference numeral 102 represents a window for checking and motor replacement, and reference numeral 104 represents an opening and closing door for opening and closing the window 102.

Mainly referring back to FIGS. 2 and 3, the output shaft 74 of the reduction gear 26A for turning is provided with a rotary mount 74C connected via a key 74B. The reduction gear 26B for tilting is connected with the rotary mount 74C via a bolt 110, and the output shaft 112 of the reduction gear 26B for tilting is rotatably supported by support holes 114 and 116. The output shaft 112 of the reduction gear 26B for tilting is connected with a panel hold mount 120 for attaching the power generation panel 22 via a key 112A. In addition, as mentioned above, the reduction gear 26B for tilting basically has completely the same configuration as the reduction gear 26A for turning that has already been described except that the shape of the output shaft 112 differs.

Here, the meshing state of the externally toothed gear 54, the internally toothed gear 60, and the like, will be described in detail. As mentioned above, in this embodiment, the externally toothed gear 54 is assembled to the internally toothed gear 60 in an interference fit. Here, the "interference fit" means a relation in which the externally toothed gear 54 and the internally toothed gear 60 cannot be assembled together (be made to mesh with each other) as they are in a normal assembling environment, i.e., under the condition that the temperatures of the toothed gears are the same.

Figure 6:
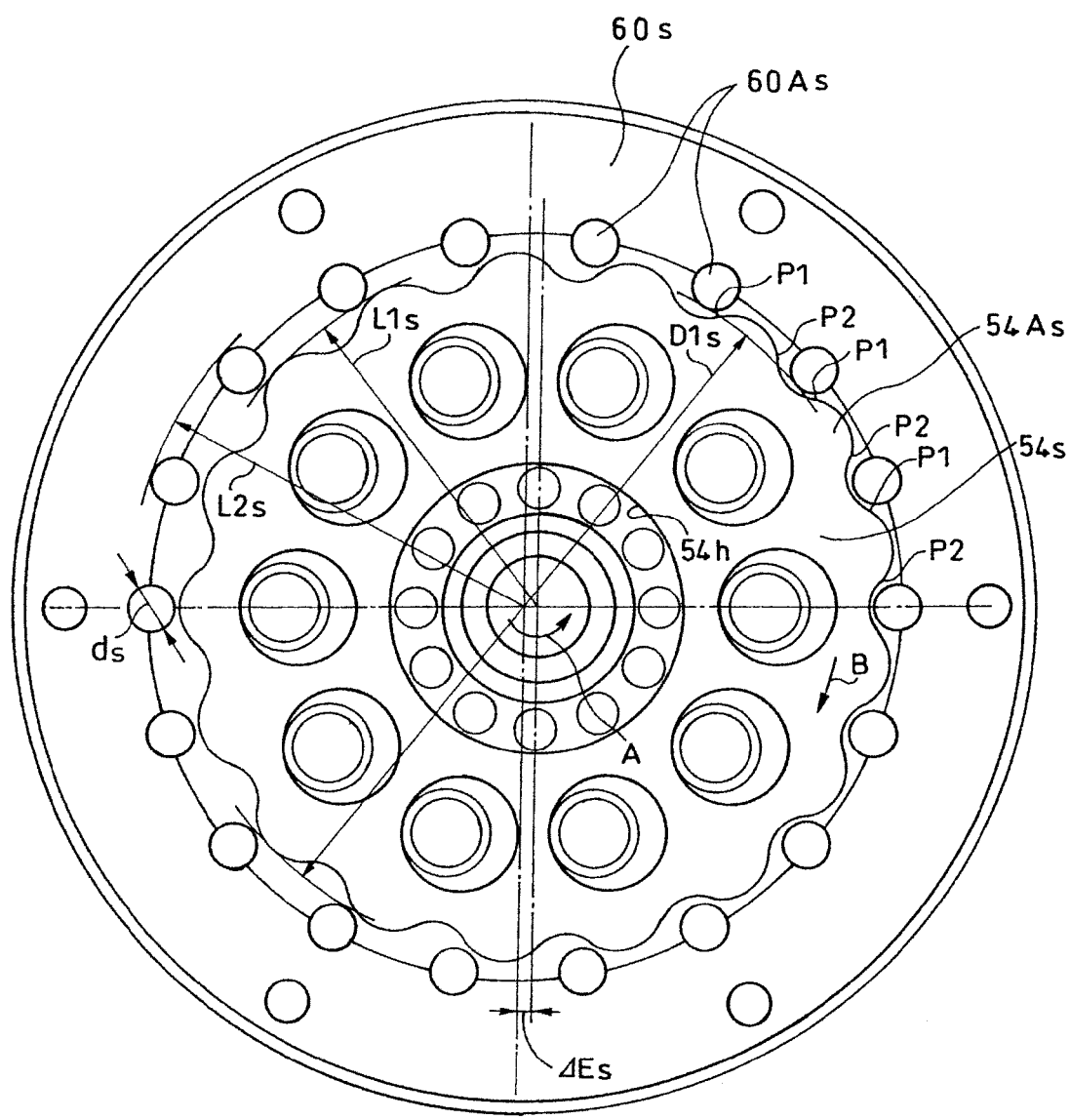
FIG. 6 is a schematic view exaggeratingly depicting a tooth form in a clearance fit.
Figure 7:
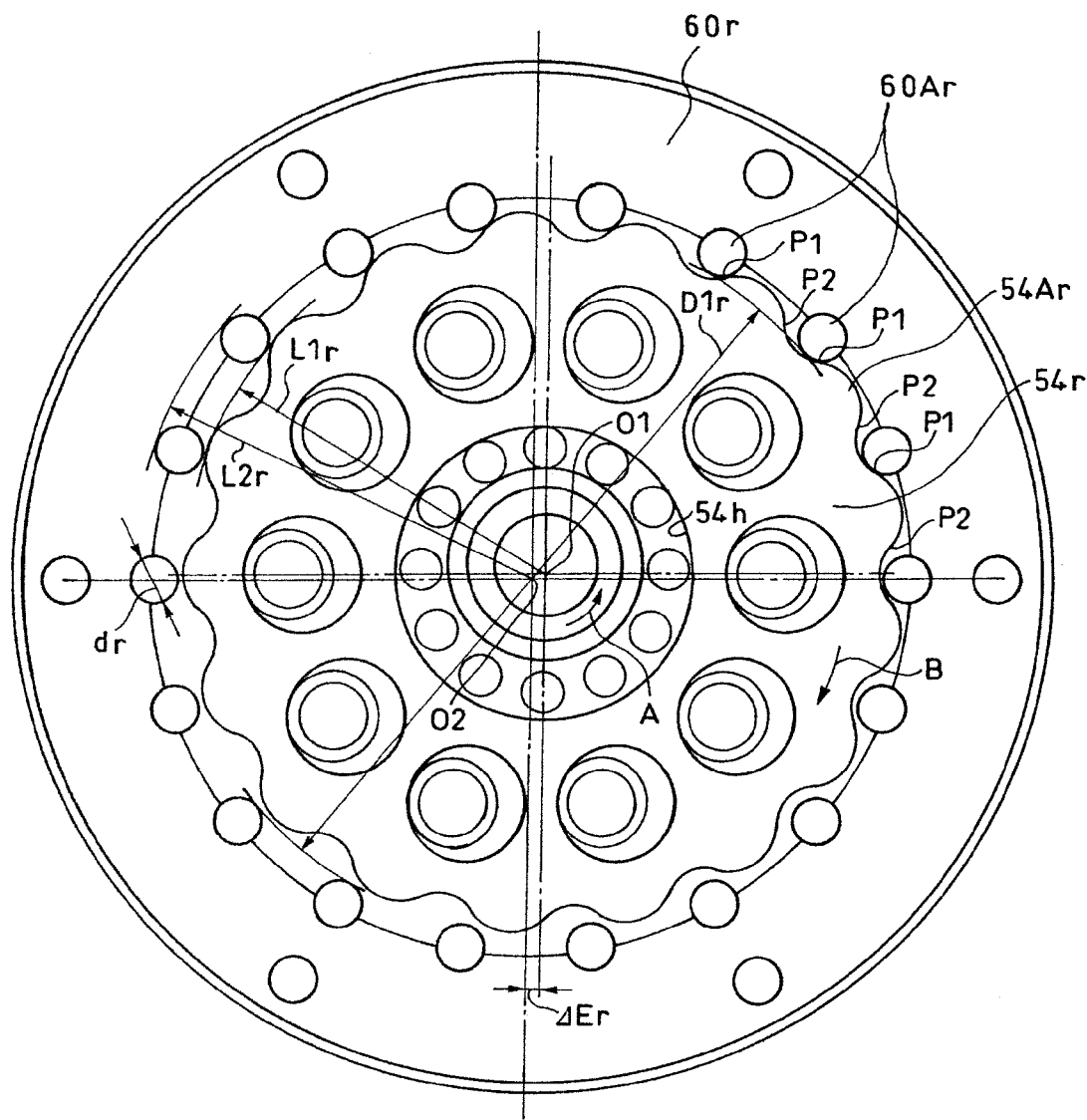
FIG. 7 is a schematic view exaggeratingly depicting a tooth form in an abutment without any clearance.
Figure 8:
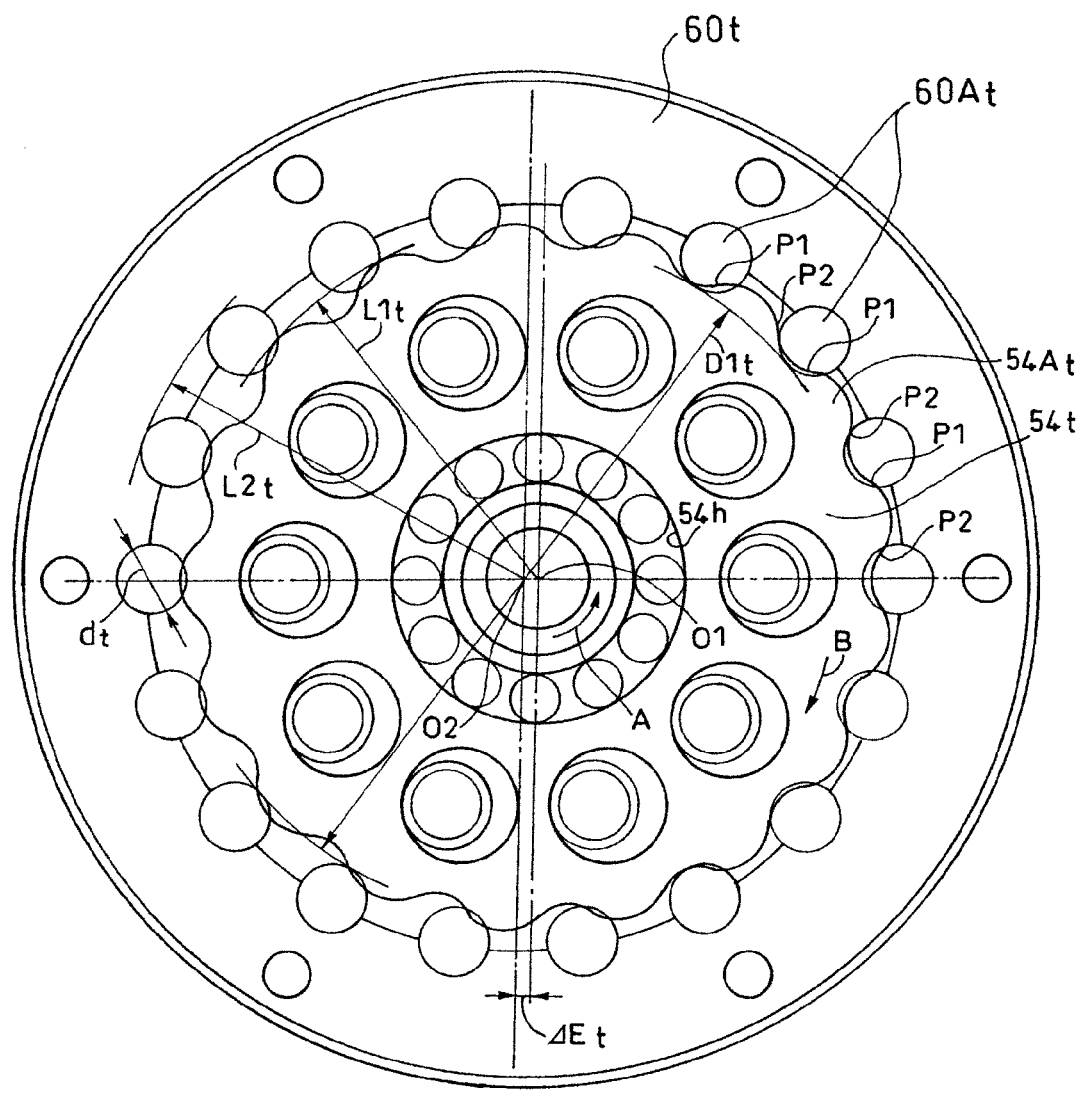
FIG. 8 is a schematic view exaggeratingly depicting a tooth form in an interference fit.

FIG. 6 schematically and exaggeratingly depicts a conventional tooth form in a clearance fit, FIG. 7 schematically and exaggeratingly depicts a theoretical tooth form (or a created tooth form) that does not have any clearance at all, and FIG. 8 schematically and exaggeratingly depicts a tooth form in an interference fit. As shown in FIG. 6, in this kind of internally meshing planetary gear mechanism, assembly of the externally toothed gear 54 and the internally toothed gear 60 was conventionally performed in a "clearance fit" that has a clearance of −(minus)0.1% to −0.05% with respect to the diameter from the center of the externally toothed gear 54 to a meshing point with the internally toothed gear 60 of the external tooth 54A of the externally toothed gear 54. Accordingly, the externally toothed gear 54 and the internally toothed gear 60 could be assembled together (be made to mesh with each other) as they are even in a normal assembling environment, i.e., under the condition that the temperatures of the toothed gears are the same. However, in this embodiment, as shown in FIG. 8, assembling of the externally toothed gear 54 and the internally toothed gear 60 in an "interference fit" of, for example, +(plus)0.005% to +0.1% in a state where the toothed gears cannot be daringly assembled together as they are.

Some techniques can be employed in order to form this state.

For example, as shown below, it is considered that the dimension of the conventional "subscript s", as shown in FIG. 6, is set to the dimensions of the "subscript t", as shown in FIG. 8, with respect to the dimension of the "subscript r" in a theoretical tooth form (or a created tooth form) that does not have the clearance shown in FIG. 7 at all.

a) A conventional diameter $D1s$ that was larger than a diameter $D1r$ of the circle that connects the innermost peripheral points (tips) of the outer pins (internal teeth) 60A of the internally toothed gear 60 is set to a $D1t$ ($D1s$>$D1r$>$D1t$) that is smaller than the diameter $D1r$. b) A conventional diameter $L1s$ that was smaller than a dimension $L1r$ from an axis $O1$ of the externally toothed gear 54 to the tip of the externally toothed gear 54 is set to $L1t$ ($L1s$<$L1r$<$L1t$) that is larger than the dimension $L1r$. c) A conventional dimension $L2s$ that was larger than a dimension $L2r$ from an axis $O2$ of the internally toothed gear 60 to the outermost peripheral points (tooth bottoms) of the outer pins 60A of the internally toothed gear 60 is set to a dimension $L2t$ ($L2s$>$L2r$>$L2t$) that is smaller than the dimension $L2r$. d) A conventional diameter $ds$ that was smaller than the diameter $dr$ of the outer pins 60A is set to a dimension $dt$ ($ds$<$dr$<$dt$) that is larger than the diameter $dr$.

In short, it is said that, when the tooth form, i.e., the theoretical tooth form (or generated tooth form) of each of the externally toothed gear 54 and the internally toothed gear 60 in a state where the gears abut on each other without any clearance and without any elastic deformation at their engaging portion is defined as an abutment tooth form, some of the tooth form of the externally toothed gear 54 or the internally toothed gear 60 is formed in the state of overhanging toward its mating gear relatively more than the abutment tooth form. In addition, the concept of "some of the tooth form" includes some external teeth of all the external teeth or some internal teeth of all the internal teeth. For example, in FIG. 7, these techniques may be used for only several external teeth (for example, every other one piece or plural pieces of external teeth) 54Ar among 17 teeth or the external teeth 54Ar. Otherwise, these techniques may be used for only several outer pins (for example, every other one piece or plural pieces of outer pins) 60Ar among 18 teeth or the outer pins (internal teeth) 60Ar. This can further improve operating efficiency while hardly reducing a reverse driving preventing effect.

Moreover, as modifications of these techniques, for example, e) a technique of setting a conventional eccentricity ΔEs that was smaller than the eccentricity ΔEr of the externally toothed gear 54 to an eccentricity ΔEt that is larger than the eccentricity ΔEr (ΔEs<ΔEr<ΔEt) can also be adopted. In short, this technique is said that, when the eccentricity of the externally toothed gear 54 in a state where the externally toothed gear 54 and the internally toothed gear 60 abut on each other without any clearance and without any elastic deformation at their engaging portion is defined as an abutment eccentricity ΔEr, the eccentricity ΔEt of the externally toothed gear 54 is set to a value that is larger than the abutment eccentricity ΔEr.

Since the technique of obtaining an interference fit by the increasing operation of the eccentricity is sufficiently performed only by shifting the formation position of an eccentric body hole 54h (a hole engaged with the roller bearing 50) formed in the externally toothed gear 54 largely than a dimension equivalent to a normal eccentricity, a design change in a conventional article can be suppressed small.

In addition, all the above techniques are examples of setting, and adoption of other techniques is not prohibited. Additionally, only one of any of the above examples of setting may be adopted, and two or more examples of setting may be suitably adopted in combination. Moreover, for example, in a case where the diameter (shape of the internal teeth) of the outer pins 60A is changed on the side of the internally toothed gear 60 apart from the selection of size, if it is better that the shape of the tooth form 54A of the externally toothed gear 54 is changed according to the changed diameter (the shape of the internal teeth), this may be naturally performed. In this regard, meshing in an interference fit is required as a result.

The externally toothed gear 54 and the internally toothed gear 60 have dimensions that are set so as to become an "interference fit" in this way, and are forcibly assembled in a meshing state by an assembling method, such as shrinkage fit that makes the temperature of the internally toothed gear 60 high, cooling fit that makes the temperature of the externally toothed gear 54 low, or press fit.

Next, the operation of the solar power generation system 20 will be described focusing on the operation of the driving unit 26.

When the pinion 40 of the motor M1 rotates, the gear 42 rotates, and the input shaft 44 rotates integrally with the gear 42. Since the eccentric body 46 is integrally formed in the input shaft 44, the externally toothed gear 54 starts oscillating eccentrically via the roller bearing 50 by the rotation of the input shaft 44. However, since the externally toothed gear 54 internally meshes with the internally toothed gear 60, and the internally toothed gear 60 is integrated with the first casing 62 and is maintained in a fixed state, free rotation of the externally toothed gear 54 is restrained, and the engagement position of the outer pins (internal teeth) 60A of the internally toothed gear 60 and the external teeth 54A of the externally toothed gear 54 shift sequentially with oscillating. As a result, with respect to the internally toothed gear 60, only the phase of the externally toothed gear 54 shifts (axially rotates) by an angle equivalent to a difference in the number of teeth therebetween whenever the input shaft 44 makes one rotation. The direction in which the engagement position shifts coincides with the rotational direction (i.e., the direction in which the eccentric body rotates: for example, the arrow A) of the input shaft 44, and the axially rotating direction (i.e., the rotational direction of the output shaft 74: the arrow B in this case) of the externally toothed gear 54 becomes a direction opposite to the rotational direction of the input shaft 44. The oscillating component of the externally toothed gear 54 is absorbed by the loose fitting between the internal roller 82 and the inner pin hole 78, and only an axial rotation component is transmitted to the output shaft 74 via the inner pin 76 and the internal roller 82.

In addition, the operation of an "interference fit" at this time will be described below.

The rotation of the output shaft 74 is taken out from the rotary mount 74C via the key 74B. Thereby, the reduction gear 26B for tilt mounting on the rotary mount 74C, and its output shaft 112 rotate horizontally, and the panel hold mount 120 attached to the output shaft 112 rotates horizontally, whereby the power generation panel 22 attached to the panel hold mount 120 rotates horizontally. As a result, the power generation panel 22 can be directed to a desired direction.

On the other hand, the reduction gear 26B for tilting is driven by completely the same operation, and the output shaft 112 is rotated whereby the panel hold mount 120, which rotates integrally with output shaft 112 via the key 112A, rotates vertically (refer to FIG. 2). As a result, the power generation panel 22 can be directed at the desired angle of elevation.

The internally meshing planetary gear mechanism adopted in the reduction gear 26A is compact, can obtain a high reduction ratio, and can be housed and arranged with allowance even within a narrow cylindrical strut 24.

Additionally, since the through hole 30 (the input shaft through hole 30A and the output shaft through hole 30B) is formed in the reduction gear 26A for turning so as to pass therethrough, a power cable that is not shown here can be inserted through the hole. Especially, in this embodiment, the pipe 92 along with the O rings (sealing machine style) 96 and 98 are arranged within the through hole 30 and the pipe 92 is also made to function as a casing on the inner peripheral side of the reduction gear 26A. Therefore, a power cable inserted into the pipe 92 can be effectively prevented from being damaged by the high-speed rotation of the input shaft 44. Additionally, by the presence of the pipe 92, the reduction gear 26A is within the cylindrical strut 24 and the inside thereof is completely isolated from the external world. Therefore, the reduction gear 26A can be prevented from being directly exposed to rain, dust, the heat of summer, snow, frost, or the like of winter, temporal durability is high, and problems, such as a malfunction, hardly occur.

Additionally, an animal or a wild bird, for example, can be effectively prevented from being caught up in the drive system of the reduction gear 26A, or contrary to this, the reduction gear 26A itself can also be effectively prevented from being damaged by an animal or a wild bird.

In addition, rain that has been transmitted through the rotary mount 108, or the like, is spread after being guided into the earth through the inside of the pipe 92. Additionally, although the reduction gear 26B for tilting is not housed in the cylindrical strut 24, almost the same effect can be obtained since the reduction gear is housed within a sealed casing.

In addition, replacement of the motor M1 in the cylindrical strut 24 or reduction gear 26A maintenance can be performed via the window 102 by opening and closing the opening and closing door 104.

Here, the operation of the "interference fit" of the externally toothed gear 54 and the internally toothed gear 60 will be described.

Although, for convenience, the description is made using reduction gear 26A for turning as an example, the situation is completely the same even in the reduction gear 26B for tilting.

When the power generation panel 22 tends to rotate under the influence of wind, a state where torque is applied from the output shaft 74 occurs in the reduction gear 26A.

<When Reduction Gear 26A has Stopped>

For example, when the power generation panel 22 is not driven at night or the like, the reduction gear 26A has stopped. At this time, when the power generation panel 22 receives wind and torque is applied from the output shaft 74, the torque tends to make part of the inner pin hole 78 of the externally toothed gear 54 rotate in a circumferential direction via the "inner pin 76".

However, when the torque in the circumferential direction is applied from the position of the inner pin hole 78, a negligible force is applied in the direction in which the meshing position is not changed in the direction of a vector. Moreover, in this embodiment, the externally toothed gear 54 and (the outer pins 60A of) the internally toothed gear 60 mesh with each other in a compressed (elastically deformed) state by interference fit. Therefore, compared with when the gears mesh with each other by clearance fit, the meshing position cannot be changed and the externally toothed gear 54 cannot start oscillating or axially rotating, unless the further torque, that is enough to release the elastic deformation caused by this compression, is not applied. Accordingly, the power generation panel 22 can maintain a stopped state even against strong winds compared with when the gears are in an interference fit.

<Starting by Motor M1>

When the input shaft 44 is rotated by the motor M1, the force needed to move the radial position of the externally toothed gear 54 via the eccentric body 46 and the roller bearing 50 takes effect. That is, when being driven from the motor M1, a force is very effectively applied in a direction in which the engagement position is shifted from the previous output side unlike when the torque in a circumferential direction is input. Therefore, oscillating can be sufficiently started by the driving force of the motor M1, and the externally toothed gear 54 starts rotating (axial rotation).

<Continuous Driving by Motor M1 (after Starting)>

As mentioned above, in a case where the input shaft 44 rotates, for example, in the direction of the arrow A, the direction in which the engagement position of the externally toothed gear 54 and the internally toothed gear 60 shifts is in the direction of the arrow A, and the direction in which the externally toothed gear 54 axially rotates is in the direction of arrow B opposite thereto. The case where the input shaft 44 rotates in the direction of the arrow A is now considered, counter-meshing side P2 to which the driving torque of the external teeth 54A is not applied is originally brought into a situation where a clearance is apt to be formed (refer to FIGS. 6 and 7 that are easy to understand) at the moment when rotation is started, and a slight clearance is formed on the counter-engagement side P2 according to the "deformation (crushing) of the external teeth 54A" caused by the driving force from the motor M1 (regardless of interference fit). That is, the direction in which a clearance is formed is the forward traveling direction of the axial rotation of the externally toothed gear. Once a clearance is formed, the fit resistance disappears substantially, and the externally toothed gear 54 can continue oscillating and rotating axially smoothly.

In addition, even when the additional use aspect of "restraining the axial rotation of the externally toothed gear and rotating the internally toothed gear" of the internally meshing planetary gear mechanism is adopted, the operation where the direction in which a clearance is formed becomes the forward traveling direction of the axial rotation of the internally toothed gear is the same.

As a result, once starting the transmission efficiency during operation becomes almost comparable to when the reduction gear 26A is configured by the same clearance fit as a conventional reduction gear, and high-efficiency operation can be performed.

<When Small Disturbance is Caused During Driving by Motor M1>

Although a disturbance to move the power generation panel in the same direction as the normal traveling direction of the power generation panel 22, and a disturbance to move the power generation panel in an opposite direction are considered as the disturbance during driving by the motor M1, the eccentric body 46 continues rotation at the same speed and the externally toothed gear 54 continues oscillating at the same speed unless the rotating speed of the motor M1 is not changed by the disturbance in any direction. Accordingly, the output shaft 74 can also continue rotation at the same speed.

Additionally and typically, a greater part of operation falls within this range.

<When Large Disturbance is Caused During Driving by Motor M1>

When a large disturbance to move the power generation panel 22 is caused in the same direction as the normal traveling direction, the load of the motor M1 decreases. Therefore, the elastic deformation caused by driving the motor M1 at the meshing point P1 becomes small, and fit resistance occurs again. Therefore, the oscillating of the externally toothed gear 54 hardly occurs, and acceleration of the power generation panel 22 can be effectively suppressed.

Additionally, since the driving force itself of the motor M1 is applied as a resistance factor when a large disturbance to move the power generation panel 22 is caused in a direction opposite to the normal traveling direction, deceleration and reverse rotation can also be prevented.

The power transmission device according to this embodiment can obtain high operating efficiency while obtaining high reverse driving prevention characteristics regardless of whether it is during a stop or during continuous driving. That is, substantially ideal characteristics are provided as the driving unit of the solar power generation system, and the ultimate power generation efficiency can be enhanced by a great deal.

In addition, although the example in which the power transmission device according to the invention is applied to the reduction gear 26A for turning or to the reduction gear 26B for tilting of the driving unit 26 of the solar power generation system has been described in detail, even if the power transmission device according to the invention is applied to, for example, a driving unit of a wind power generation system, completely the same operation, especially the operation that is advantageous to the "interference fit" can be effectively obtained.

An example when the power transmission device according to the invention is applied to a driving unit of a wind power generation system will be described below.

Figure 9:
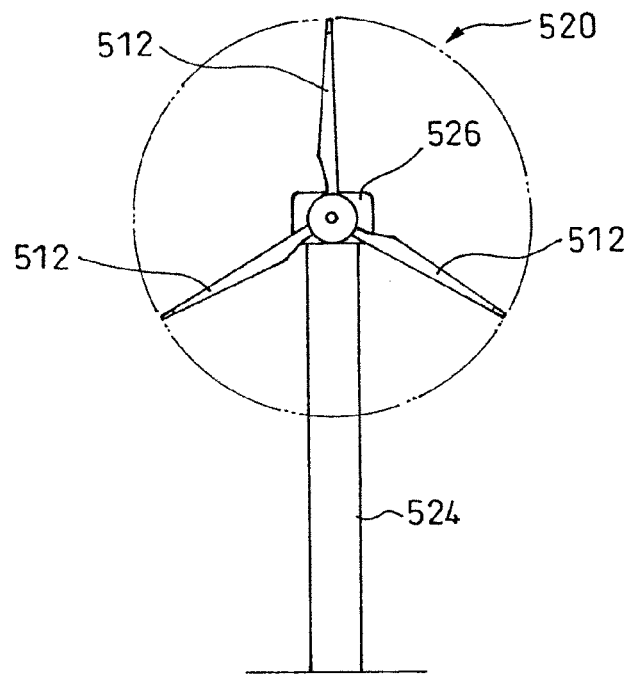
FIG. 9 is a schematic front view of a wind power generation system to which a power transmission device according to another embodiment of the invention is applied.
Figure 10:
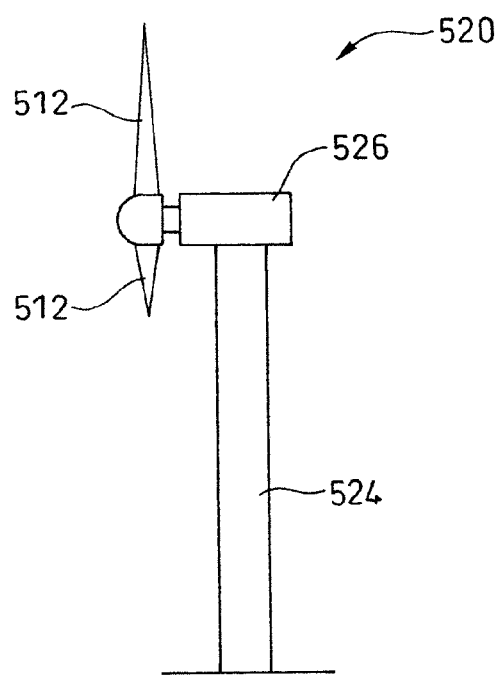
FIG. 10 is a side view of the wind power generation system.

FIG. 9 is a schematic front view of a wind power generation system 520, and FIG. 10 is a side view of the wind power generation system.

Figure 11:
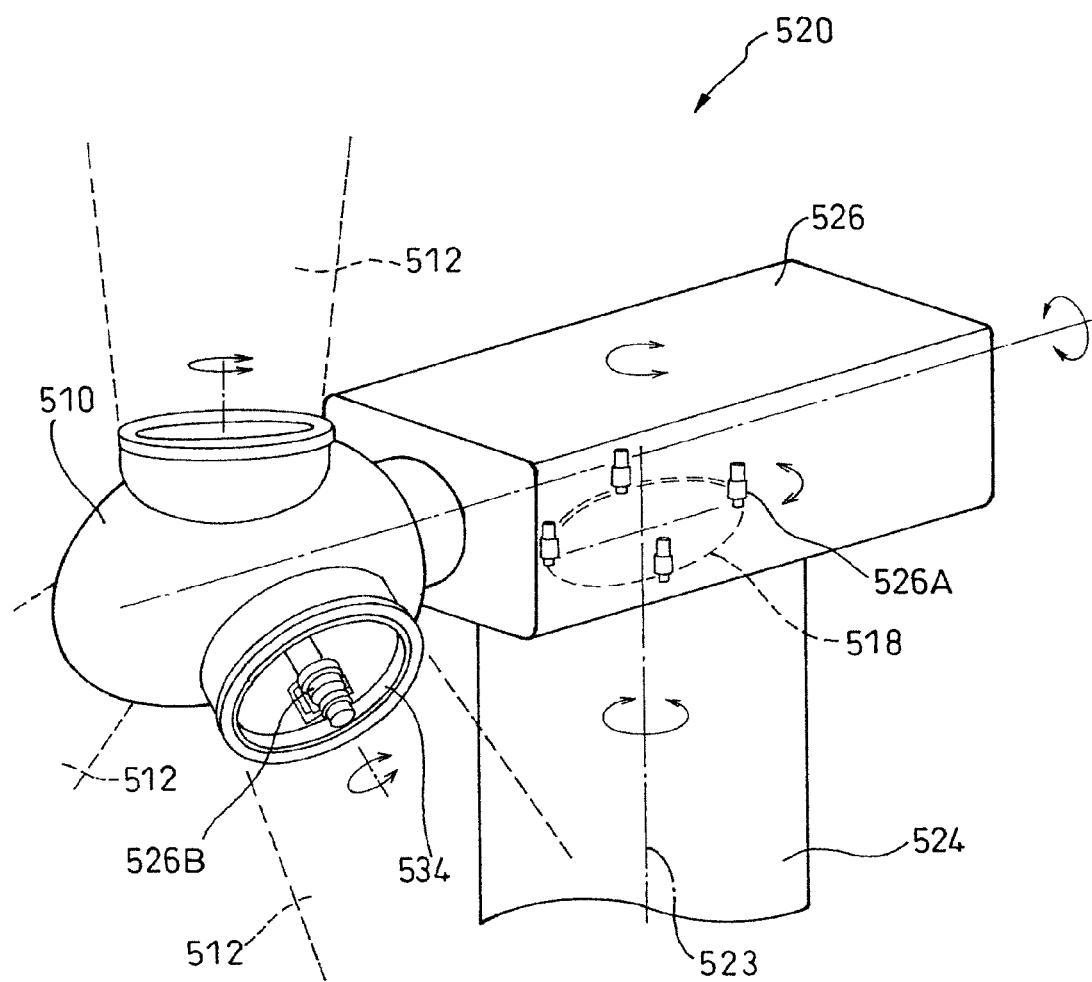
FIG. 11 is a perspective view showing the outline of a driving unit in this embodiment.

The wind power generation system 520 has a driving unit 526 at an uppermost portion of a cylindrical strut 524. FIG. 11 is a perspective view showing the outline of the driving unit 526. A reduction gear 526A for yaw driving (power transmission device) and a reduction gear 526B for pitch driving (power transmission device) that is a modification thereof are assembled into the driving unit 526. The reduction gear 526A for yaw driving is used to control the whole turning angle of the driving unit 526, and four reduction gears are depicted in the illustrated example. The reduction gear 526B for pitch driving is used to control the pitch angle of three windmill blades 512 attached to a nose cone 510.

Figure 12:
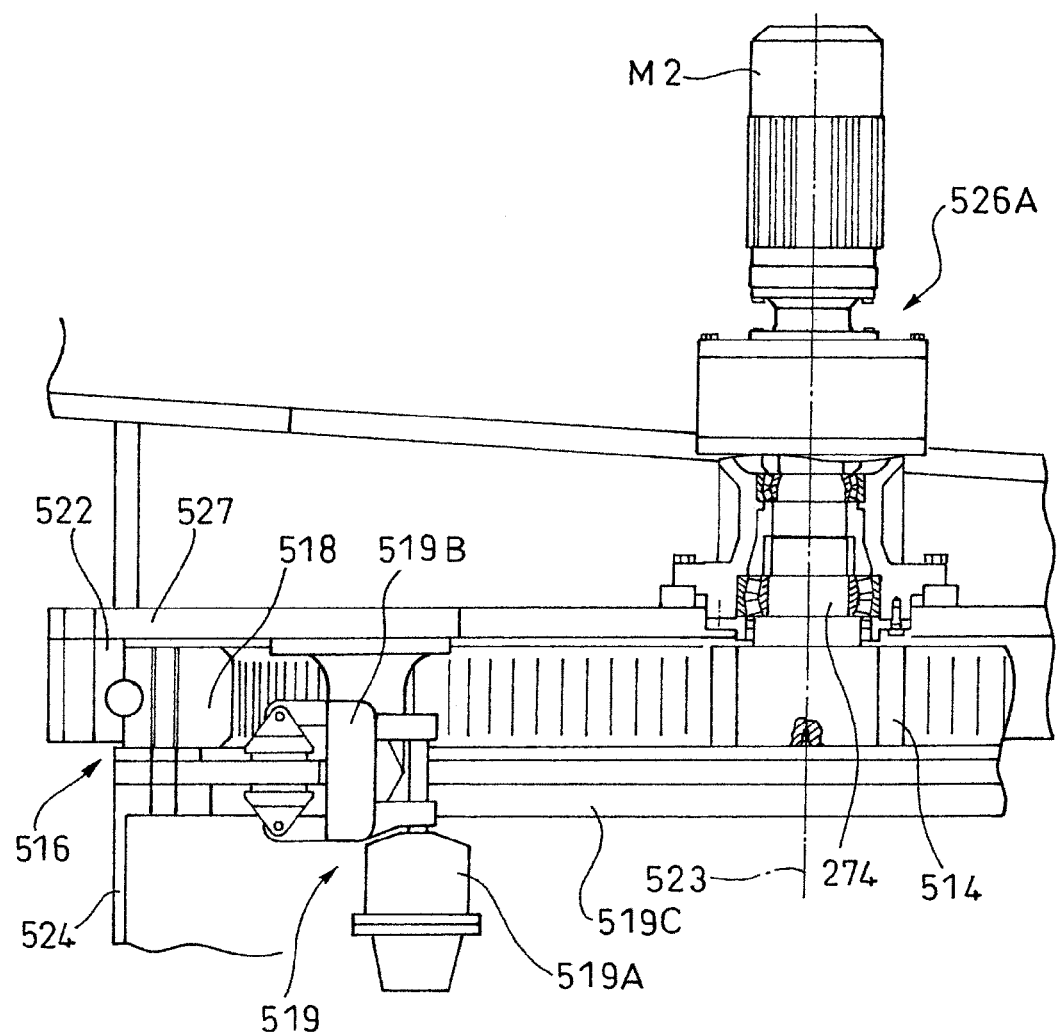
FIG. 12 is a partially broken front view showing a configuration near a reduction gear for yaw driving in this embodiment.
Figure 13:
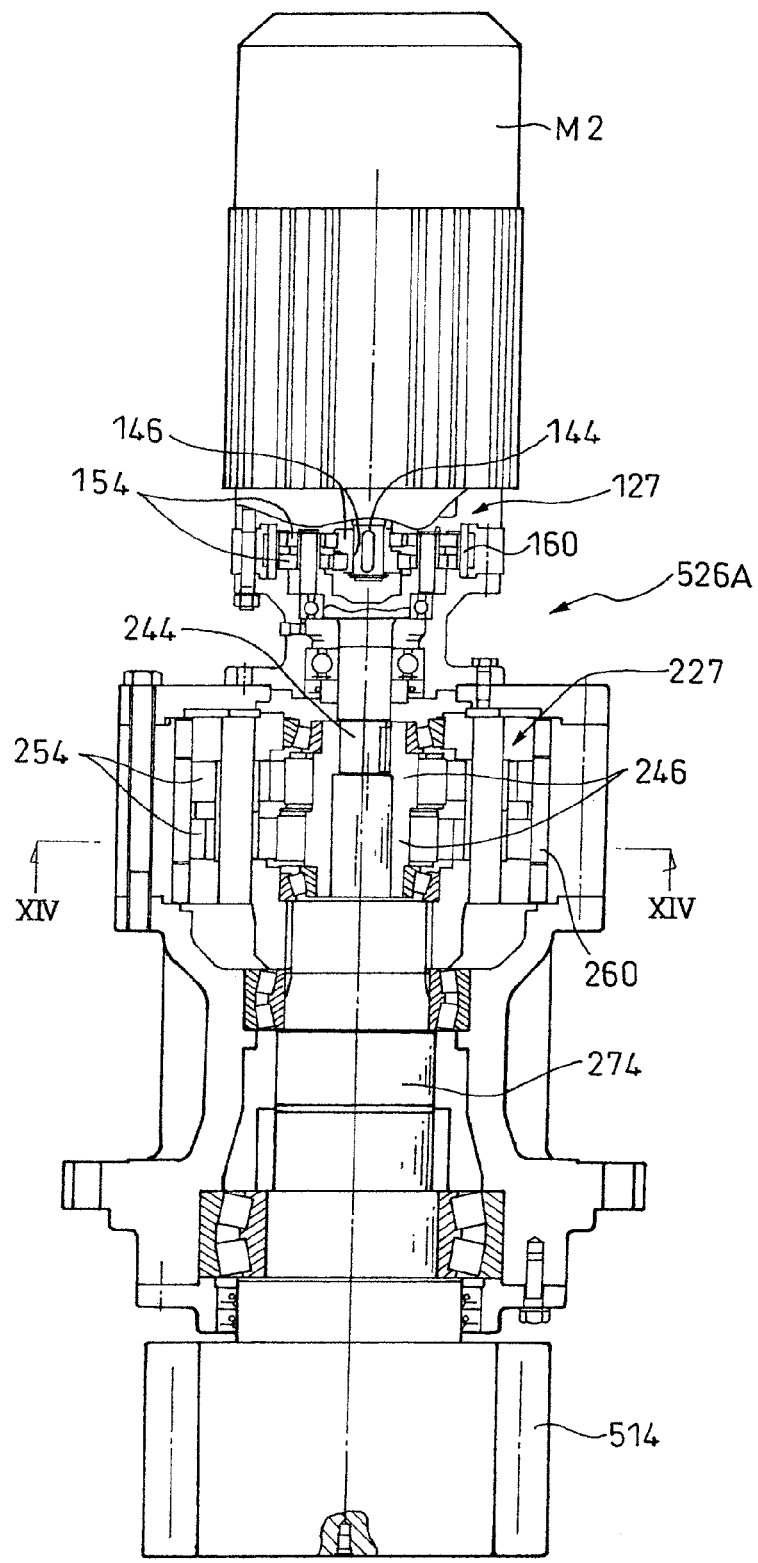
FIG. 13 is a sectional view of the whole reduction gear for yaw driving.
Figure 14:
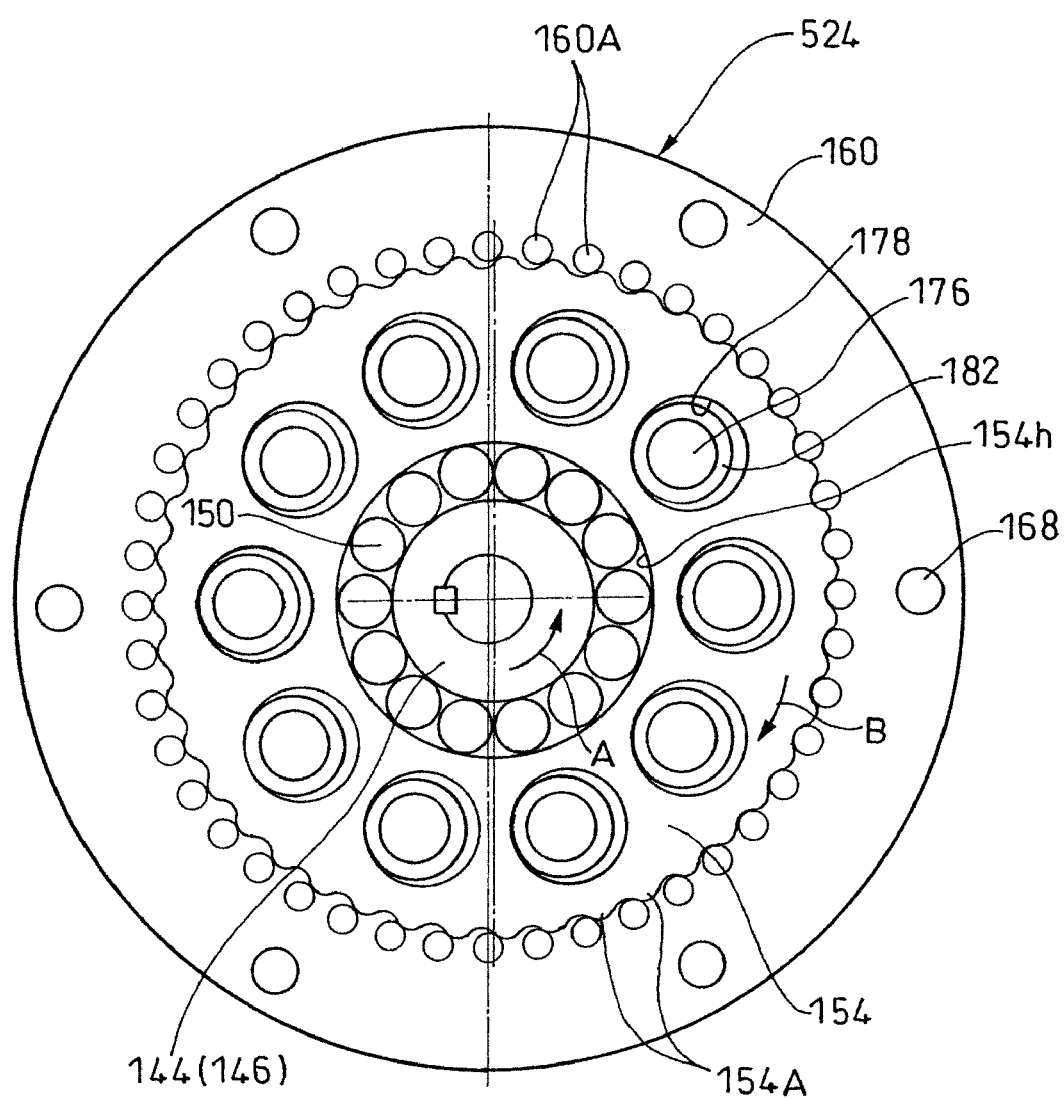
FIG. 14 is a sectional view taken along a line XIV-XIV in the arrow direction of FIG. 13.

FIG. 12 is a partially broken front view showing a configuration near the reduction gear for yaw driving 526A, FIG. 13 is a sectional view of the whole reduction gear 526B for yaw driving, and FIG. 14 is a sectional view taken along a line XIV-XIV in the direction of the arrow in FIG. 13.

The reduction gear 526A for yaw driving is provided with a configuration in which internally meshing planetary gear mechanisms 127 and 227 having basically the same configuration as the internally meshing planetary gear reduction style 27 in the reduction gear 26A (and reduction gear 26B for tilting) for turning in the previous embodiment are connected in series. This is because the reduction gear 526A for yaw driving requires a very high reduction ratio of 1/1000 to 1/2000 in terms of function. The internally meshing planetary gear mechanism 127 or 227 has an input shaft 144 or 244, an eccentric body 146 or 246 provided on the input shaft 144 or 244, an externally toothed gear 154 or 254 eccentrically oscillating via the eccentric body 146 or 246, and an internally toothed gear 160 or 260 with which the externally toothed gear 154 or 254 internally meshes. The configuration and operation of individual members are the same as the configuration and operation of corresponding members of the foregoing reduction gear 26A for turning. Additionally, the externally toothed gear 154 or 254 is assembled to the internally toothed gear 160 or 260 in an interference fit. This point is the same as that of the foregoing reduction gear 26A for turning.

A pinion 514 for yaw driving is attached to an output shaft 274 of the reduction gear 526A for yaw driving. The pinion 514 for yaw driving internally meshes with a ring gear portion 518 that constitutes an inner ring of a yaw bearing 516. The ring gear portion 518 is fixed to the cylindrical strut 524, and an outer frame portion 522 that constitutes an outer ring of the yaw bearing 516 is fixed to a casing body 527 of the driving unit 526. This configuration allows the whole driving unit 526 to be turned around an axis 523 of the cylindrical strut 524 through the meshing between the ring gear portion 518 of the pinion 514 for yaw driving and the yaw bearing 516 by rotating the output shaft 274 of the reduction gear 526A for yaw driving.

In addition, reference numeral 519 of FIG. 12 represents a brake unit that suppresses the rotation of the windmill blade 512 and is composed of a brake thruster 519A, a yaw brake caliper 519B, a brake disc 519C, etc.

Figure 15:
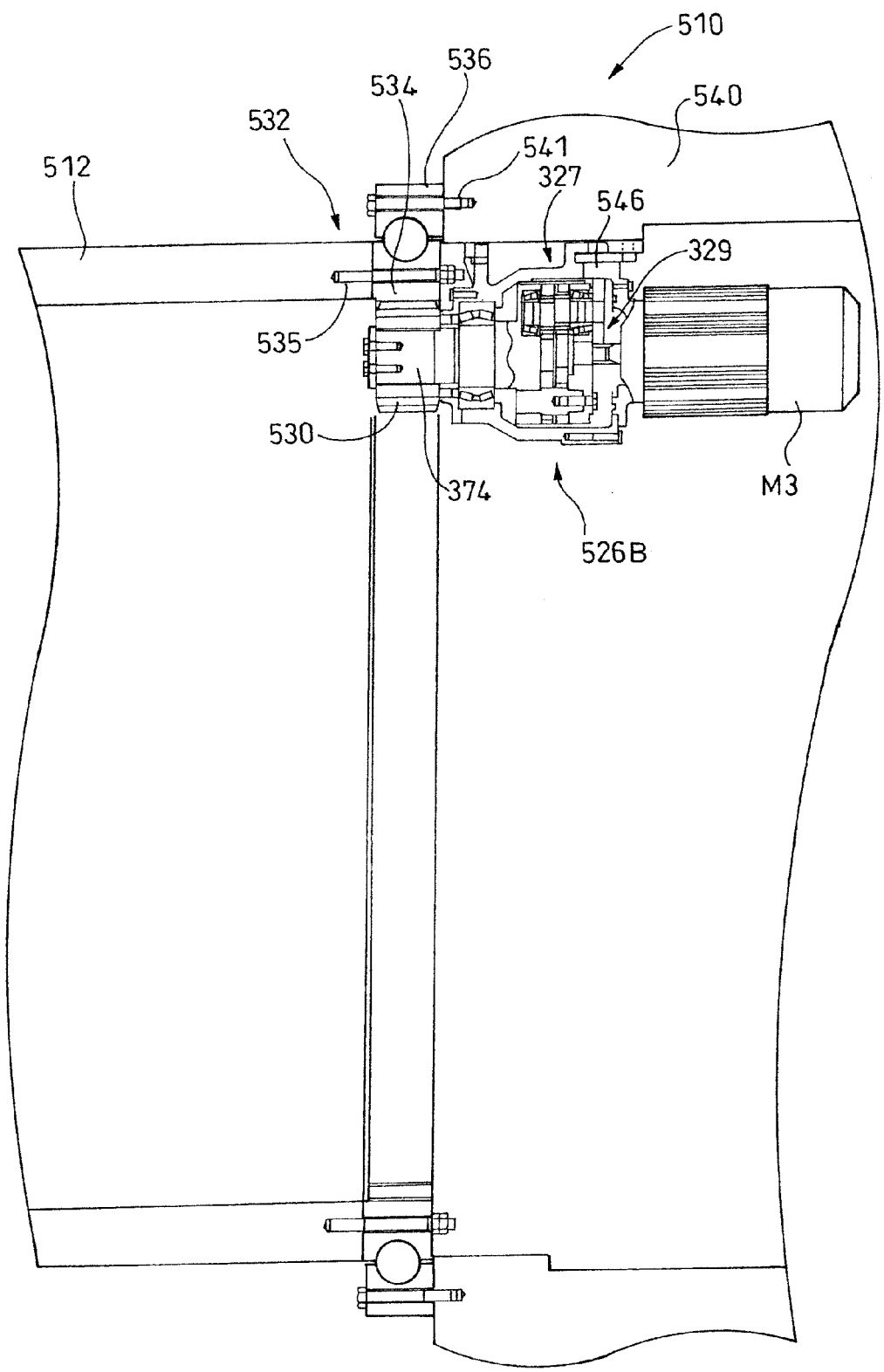
FIG. 15 is a sectional view showing a configuration near a reduction gear for pitch driving in this embodiment.
Figure 16:
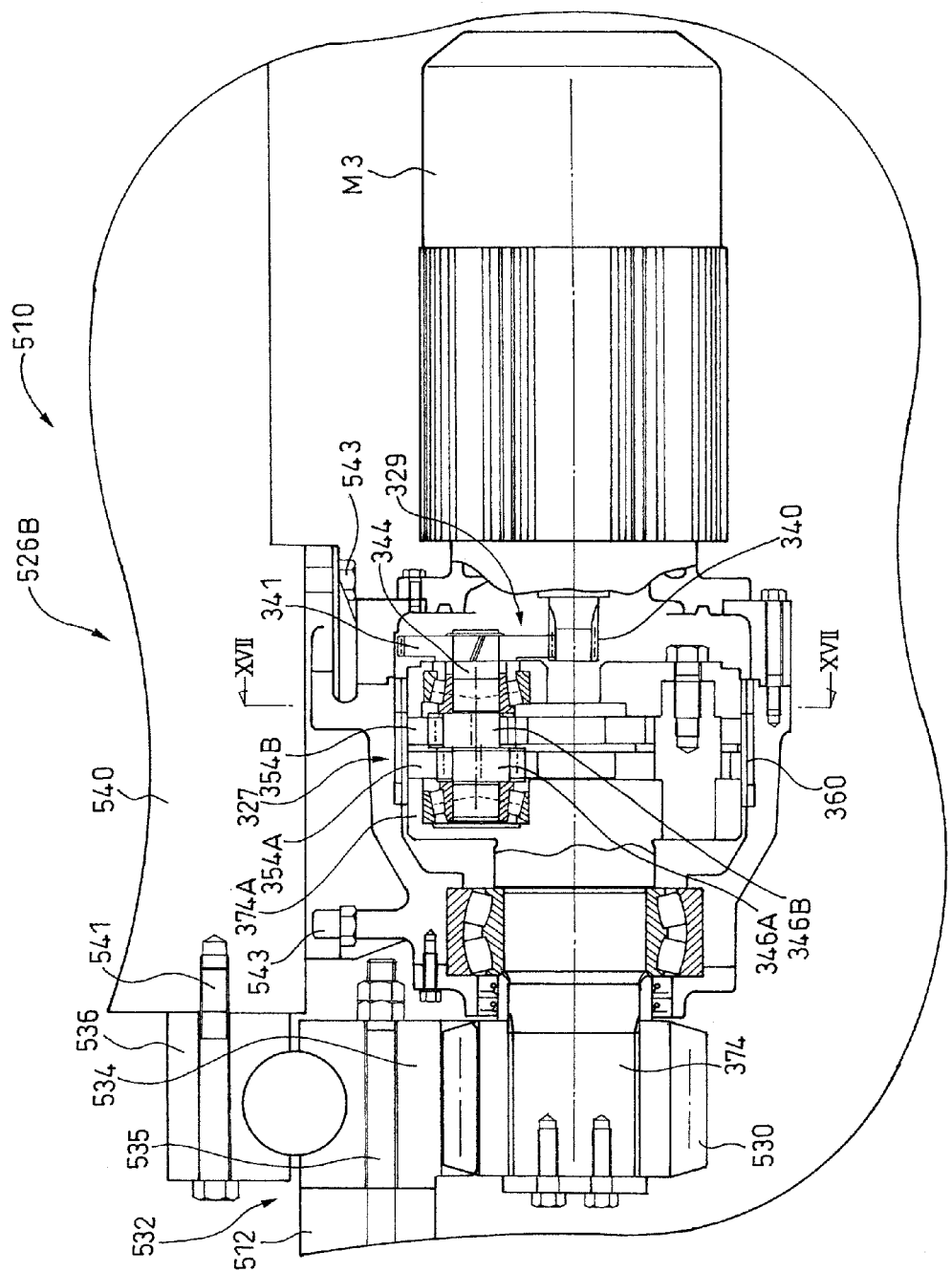
FIG. 16 is an enlarged sectional view of essential parts of the reduction gear.
Figure 17:
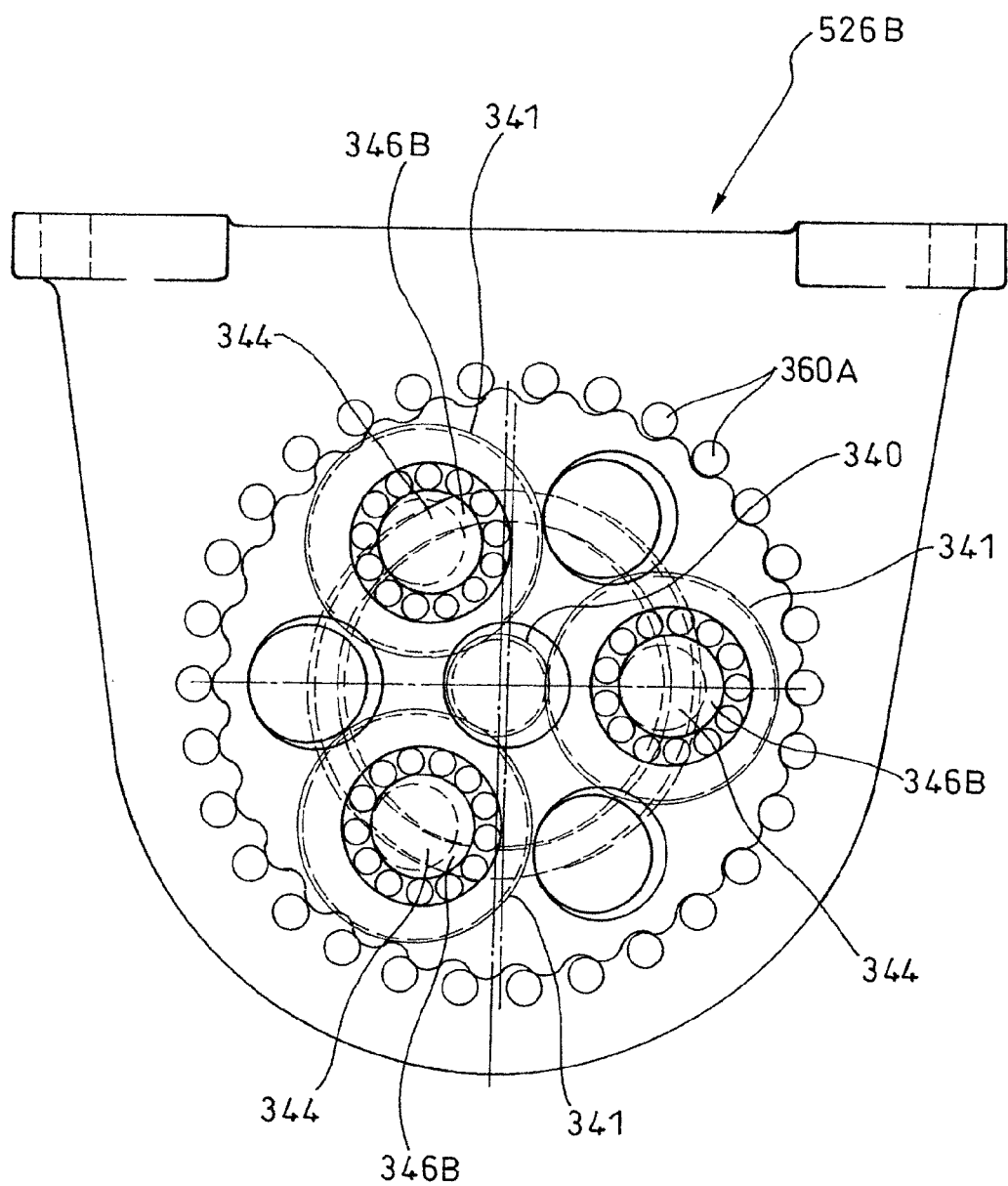
FIG. 17 is a sectional view taken along a line XVII-XVII in the arrow direction of FIG. 16.

Meanwhile, FIG. 15 shows a configuration in which the reduction gear 526B for pitch driving is assembled. FIG. 16 is an enlarged sectional view of essential parts of the reduction gear, and FIG. 17 is a sectional view taken along a line XVII-XVII in the direction of the arrow in FIG. 16. In the reduction gear 526B for pitch driving, a required reduction ratio is about 1/100 to 1/300. Therefore, a one-stage parallel axis gear mechanism 329 that distributes the output of a motor M3 to three-system input shafts 344, while reducing the speed of the motor, is adapted to be arranged at the preceding stage of the internally meshing planetary gear mechanism 327. That is, the rotation of the motor M3 is first transmitted to the three input shafts 344 via a pinion 340 and three gears 341 that mesh with the pinion 340. Each of the three input shafts 344 is provided with eccentric bodies 346A and 346B (refer to FIG. 16, and in FIG. 17, the eccentric body 346A is not visible). The eccentric phases of the (three) eccentric bodies 346A are the same, and one externally toothed gear 354A (refer to FIG. 16, and the gear is not visible in FIG. 17) is eccentrically oscillated. The eccentric phases of the (three) eccentric bodies 346B are the same, and shift from the eccentric phase of the eccentric body 346A by 180 degrees, respectively, and the other externally toothed gear 354B is eccentrically oscillated (with a phase difference of 180 degrees from the externally toothed gear 354A).

By this structure, the same meshing state as the externally toothed gear 54 and the internally toothed gear 60 of the reduction gear 26A for turning in the embodiment can be formed, and the externally toothed gears 354A and 354B can be slowly rotated axially with respect to the internally toothed gear 360. This axial rotation component is transmitted to the flange portion 374A integral with the output shaft 374 as "revolution" around the reduction gear axis of the three input shafts 344, and is taken out from the output shaft 374.

A pinion 530 for pitch is attached to the output shaft 374. The pinion 530 for pitch internally meshes with the ring gear portion 534 (refer to FIGS. 11, 15, and 16) that constitutes an inner ring of the bearing 532 for pitch. The ring gear portion 534 is fixed to each windmill blade 512 via a bolt 535.

In addition, an outer frame portion 536 that constitutes an outer ring of the bearing 532 for pitch is fixed to a casing body 540 of the nose cone 510 via a bolt 541. A casing 546 of the reduction gear 526B for pitch driving is also connected with the casing body 540 of the nose cone 510 via a bolt 543. By this configuration, the pitch angle of the three windmill blades 512 can be simultaneously controlled by rotating the output shaft 374 of the reduction gear 526B for pitch driving.

In addition, the configuration of each member of each of the internally meshing planetary gear mechanisms 127, 227, and 327 is basically the same as the configuration of each member in the internally meshing planetary gear mechanism 27 of the foregoing reduction gear 26A for turning. Therefore, in the drawings, reference numerals in which two lower digits are the same are given to the same or functionally the same portions as respective members in the internally meshing planetary gear mechanism 27 of the foregoing reduction gear 26A for turning, and detailed description of the respective members in the internally meshing planetary gear mechanism 127, 227, or 227 of the reduction gears 526A or 526B will be omitted. In addition, a brake mechanism (not shown) is attached to the motor M2 or M3 in order to fix a turning angle and a pitch angle in arbitrary positions.

According to this embodiment, the turning angle of the driving unit 526 to the cylindrical strut 524 can be controlled by driving the reduction gear 526A for yaw driving via the motor M2. As a result, the nose cone 510 can be directed to a desired direction (for example, a windward direction), and wind pressure can be efficiently received.

Additionally, by driving the reduction gear 526A for pitch driving via the motor M3, the pitch angle of the windmill blades 512 can be controlled, and as a result, reasonable power generation according to wind speed can be performed. For example, when wind speed is low, the pitch angle can be controlled to be at an angle that can receive wind pressure most efficiently. On the other hand, when wind speed is high, the pitch angle is controlled so as to suitably lower the wind pressure received by the windmill blades 512.

In addition, when wind speed is very high, the turning angle of the driving unit 526 and the pitch angle of the windmill blades 512 are controlled by the reduction gear 526A for yaw driving and the reduction gear 526A for pitch driving, respectively, and the rotation itself of the windmill blades 512 is stopped by the brake unit 519 so that the wind pressure received by the windmill blades 512 is at a minimum. Accordingly, the reverse driving preventing function of the reduction gears 526A and 526B can prevent the motor M2 or M3 from reversely rotating via the reduction gears 526A and 526B due to the wind pressure received from the windmill blades 512 at this time. As mentioned above, the motor M2 or M3 itself is also provided with a brake unit. However, if the reverse driving preventing function of the reduction gear 526A or 526B is sufficiently exhibited, even when wind speed is very high, the turning angle of the driving unit 526 (nose cone 510) can be surely prevented from rotating, or the pitch angle of the windmill blades 512 can be surely prevented from changing.

Even in this embodiment, the externally toothed gear 154, 254, or 354 and the internally toothed gear 160, 260, or 360 are assembled so that the same "interference fit" as the externally toothed gear 54 and the internally toothed gear 60 in the embodiment that has already been described is performed. Therefore, the various operations according to the reverse driving preventing function obtained by "interference fit", for example, the operations, which have been described in the forgoing embodiment, which are obtained <when the reduction gear 26A has stopped>, <at the time of starting by the motor M1>, <during continuous driving by the motor M1 (after starting)>, <when a small disturbance is caused during driving by the motor M1>, <when a large disturbance is caused during driving by the motor M1>, and the like can be obtained completely similarly.

In addition, the internally meshing planetary gear mechanism of the type in which the internally toothed gear is fixed and the externally toothed gear oscillates and axially rotates has been adopted in the above embodiment. However, in the invention, the same operation effects as the above one are obtained even in an internally meshing planetary gear mechanism of a type in which the externally toothed gear only oscillates in a state where the axial rotation thereof is restrained, and the internally toothed gear rotates.

Moreover, in this kind of internally meshing planetary gear mechanism, a type is widely known in which an input shaft provided with eccentric body is not provided in the middle of the device in its radial direction unlike in the above embodiment, but one or a plurality of input shafts with an eccentric body is rotatably provided at positions corresponding to the inner pins of the above embodiment, and each eccentric body of the input shaft is driven in the same phase by a motor, whereby the externally toothed gear eccentrically oscillates. The invention can be similarly applied to such a type of internally meshing planetary gear mechanism, and the same operation effects are obtained.

INDUSTRIAL APPLICABILITY

Although the invention has an excellent property as a driving unit of a solar power generation system, the invention can be applied to all fields requiring so-called self-locking property other than this property. Especially, in a case where the invention is applied to a system that repeatedly stops and starts, high operating efficiency and an excellent reverse driving preventing function can be made compatible with each other.

The invention claimed is:

1. A power transmission device comprising:
an internally meshing planetary gear mechanism having an input shaft, an eccentric body provided on the input shaft, an externally toothed gear eccentrically oscillating via the eccentric body, and an internally toothed gear with which the externally toothed gear internally meshes,
wherein the externally toothed gear is assembled to the internally toothed gear in an interference fit.

2. The power transmission device according to claim 1, wherein, when the tooth form of each of the externally toothed gear and the internally toothed gear in a state where the gears abut on each other without any clearance and without any elastic deformation at their engaging portion is defined as an abutment tooth form, the interference fit is obtained by forming part of the tooth form of the externally toothed gear or the internally toothed gear in the state of overhanging toward its mating gear relatively more than the abutment tooth form.

3. The power transmission device according to claim 1, wherein, when the eccentricity of the externally toothed gear in a state where the externally toothed gear and the internally toothed gear abut on each other without any clearance and without any elastic deformation at their engaging portion is defined as an abutment eccentricity, the interference fit is obtained by setting the eccentricity of the externally toothed gear to a value that is larger than the abutment eccentricity.

* * * * *